Oct. 4, 1949.                    W. R. LUSTIG                    2,483,653
                                  SEAT SLIDE
                            Filed Dec. 18, 1944
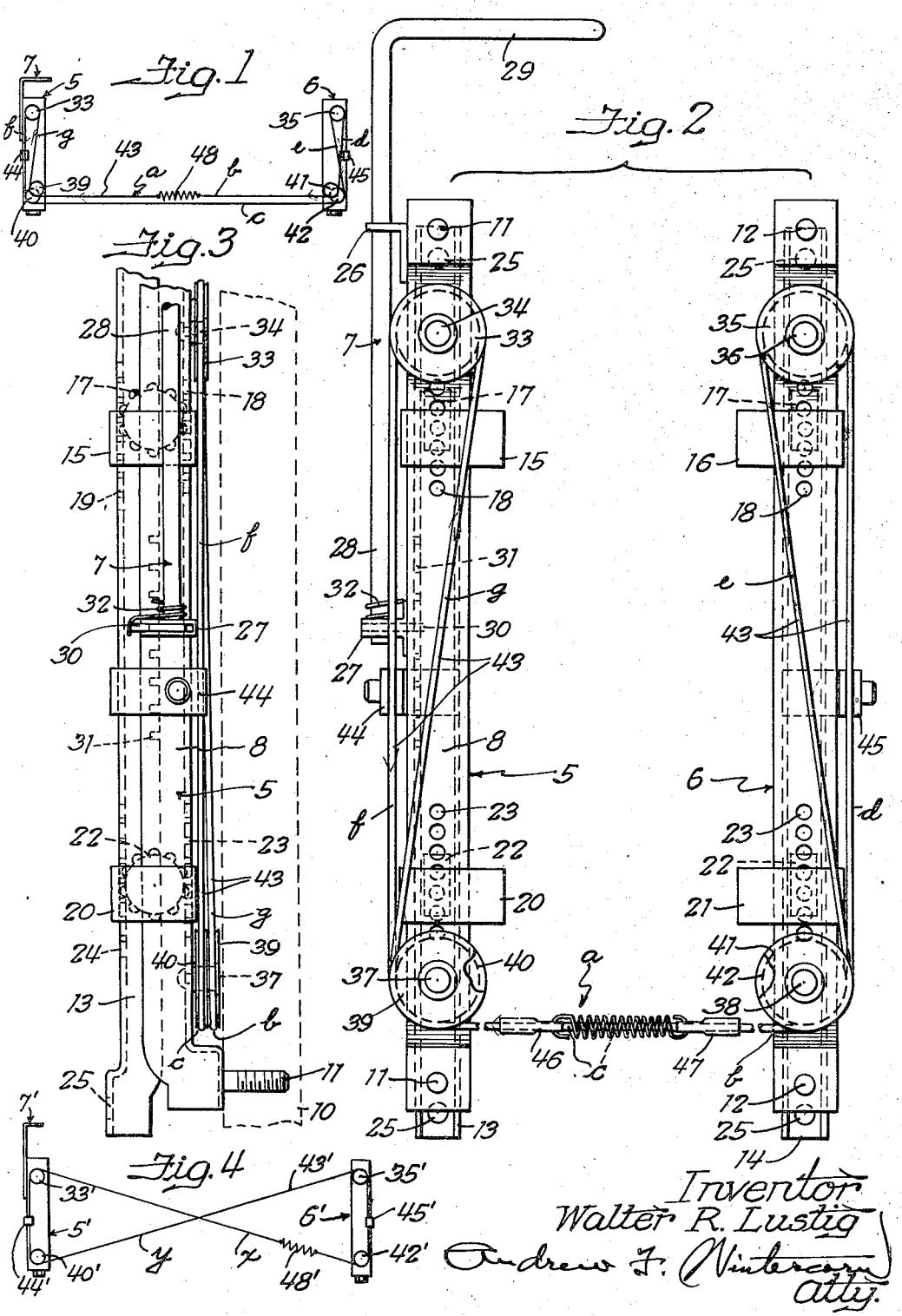
Inventor
Walter R. Lustig Patented Oct. 4, 1949

2,483,653

UNITED STATES PATENT OFFICE 2,483,653

SEAT SLIDE

Walter R. Lustig, Rockford, Ill., assignor to The Atwood Vacuum Machine Company, Rockford, Ill., a copartnership Application December 18, 1944, Serial No. 568,622

15 Claims. (Cl. 155—14)

1

This invention relates to seat slides for the slidably adjustable front seats of motor vehicles.

Seat slides have heretofore been constructed, as disclosed, for example, in Atwood et al. Patent 2,335,254, with a cross-shaft supported in bearings in upper slide rails and carrying gears on its opposite ends meshing in racks provided on lower fixed guide rails to cause the two slides to work in unison and avoid a tendency for either slide to bind when an effort was made to adjust the seat. It has been found that despite such a complicated and expensive form of equalizing means as has just been described, there was, nevertheless, a definite lag in the movement of the right-hand slide in relation to the left-hand slide and a consequent tendency toward a binding action, due partly to lost-motion in the gearing and partly to twist in the long cross-shaft. It is, therefore, the principal object of my invention to provide a cable-type equalizer in which the belt-and-pulley-type connections between the two slides positively avoid the objections mentioned, thereby affording much easier operation.

The cable, which is in one continuous length and extends over pulleys mounted on the movable slide rails and is also fastened to the fixed guide rails at points intermediate the ends thereof, may be crisscrossed between the front and rear pulleys on the slides or extended between pairs of rear pulleys on the slides by providing two additional pulleys, one on each of the slides, to accommodate the cable in that arrangement. The latter arrangement, as will soon appear, is preferable from the standpoint of avoiding interference with batteries, heaters, and other obstructions under the seat such as the longitudinally extending tunnel formed in the floor pan of some low-slung cars for the needed clearance with respect to the propeller shaft.

The invention is illustrated in the accompanying drawing, in which—

Fig. 1 is a schematic view of a pair of seat slides equipped with the cable-type equalizer of my invention;

Fig. 2 is a plan view of the same seat slides on a larger scale to better illustrate the application of the equalizing means, intermediate portions of the cable being broken away to permit showing the parts on a larger scale;

Fig. 3 is a side view of the left-hand slide structure, the front end portion of which has been broken away, and Fig. 4 is another schematic view similar to

2

Fig. 1, but showing the other crisscross arrangement of the cable which enables the same kind of operation with only four pulleys, as compared with six pulleys in the construction of Figs. 1 to 3.

Similar reference numerals are applied to corresponding parts throughout the views.

The seat slides shown in Figs. 2 and 3 are generally similar to that disclosed in the Atwood et al. patent mentioned above, the left seat slide structure 5 differing from the right seat slide structure 6 only in the provision of the latching means indicated at 7. The seat slide structures 5 and 6 comprise inverted channel-shaped upper slide rails 8 and 9 arranged to be bolted at their opposite ends to the bottom of the seat, indicated in dotted lines at 10 in Fig. 3, by means of studs 11 and 12. The two seat slide structures have channel-shaped bottom guide rails 13 and 14 which are slightly narrower than the slide rails 8 and 9 and fit freely between the downwardly projecting flanges thereof, suitable brackets 15 and 16 being fixed on the front end portions of the slide rails and slidably embracing the guide rails to maintain the rails in operative relationship to one another with a gear roller 17 inside each of the structures meshing in rack holes 18 in the upper rails and rack holes 19 provided in the bottom rails. Other brackets 20 and 21 are suitably fixed on the rear end portions of the bottom rails 13 and 14 and slidably embracing the upper rails for a similar purpose, gear rollers 22 being provided between the rails at those points meshing in rack holes 23 in the upper rails and rack holes 24 in the bottom rails. The bottom guide rails 13 and 14 are adapted to be bolted to the floor at their front and rear ends through the bolt holes 25.

The left slide structure 5 has brackets 26 and 27 fastened onto the outer side of the upper rail 8 for bearing support of the latch rod 28, the front end portion of which is bent to provide an operating handle 29 that is easily accessible for the driver when seated behind the steering wheel in driving position. A latch 30 on the inner end of the rod 28 is engageable in any one of a series of notches 31 provided in the upwardly projecting flange of the bottom rail 13, whereby to lock the seat slide structure releasably in any adjusted condition and accordingly maintain a desired position of adjustment of the seat. The latch 30 is urged toward locking position by a torsion spring 32 so that there is no likelihood of the seat being accidentally unlocked.

In accordance with my invention, a single pulley 33 is mounted on a post 34 on the front end portion of the left upper rail 8, and a single pulley 35 is mounted in like manner on a post 36 on the front end portion of the right upper rail 9, and posts 37 and 38 are provided on the rear end portions of said rails, the post 37 carrying pulleys 39 and 40, and the post 38 carrying pulleys 41 and 42, and a single continuous flexible woven wire cable 43 is wound in a novel manner around this system of pulleys on the upper rails and attached to the bottom rails 13 and 14 at 44 and 45 to afford a belt-and-pulley-type connection between the seat slide structures to positively insure movement of the upper rails 8 and 9 together. The cable 43 extends straight across between the rear end portions of the upper rails, as indicated at $a$ in Figs. 1 and 2, in closely vertically spaced parallel flights, the upper flight extending, as at $b$, from the left upper pulley 39 to the right upper pulley 41, and the lower flight, as at $c$, from the left lower pulley 40 to the right lower pulley 42. On the right seat slide structure 6 the upper flight of cable extends straight forward from the upper pulley 41, as at $d$, and 180° around the front pulley 35 and diagonally back, as at $e$, to and around the lower pulley 42, 90° to portion $c$. On the left seat slide structure 5 the cable arrangement is the reverse of that described for structure 6; the lower flight extends straight forward from pulley 40, as at $f$, to and around pulley 33 180° and diagonally back, as at $g$, to and around pulley 39, 90° to portion $b$. It will also be noticed that it is the lower flight $f$ on the left-hand side that is attached to the bottom rail 13 at 44, and it is the upper flight $d$ on the right-hand side that is attached to the bottom rail 14 at 45. The cable ends are in portion $b$ and these ends have eyelet fittings 46 and 47 affixed thereto for convenient connection of the cable ends to opposite ends of a coiled tension spring 48. The cable is of such length in relation to the system of pulleys and the distance between the seat slide structures that the spring 48 is stretched enough to maintain the cable under a predetermined light tension and so that there is no slack and consequently no appreciable lost-motion in the operation of the equalizing means when the seat is adjusted and the upper rails 8 and 9 are moved.

In operation, when the seat is to be adjusted, for example in a forward direction, the operator turns the handle 29 so as to disengage the latch 30 from its notch 31, thus leaving the upper rail 8 free to move relative to the bottom rail 13. The upper rail 9 is, of course, always free to move, but only when the belt-and-pulley connections afforded by the cable 43 and the system of pulleys permit. Now, in a forward adjustment of the left upper rail 8, the forward movement of the left front pulley 33 results in the transmission of a forward thrust through the cable 43 to the right upper rear pulley 41, because the cable 43 which extends over the system of pulleys on the upper rails is clamped at 44 and 45 to the bottom rails 13 and 14, and hence any increase in the size of the left front cable loop forwardly with respect to the clamp 44 involved in forward adjustment of the seat must be supplied by a corresponding reduction in size of the right rear cable loop behind the clamp 45. Needless to say, any rearward movement of the left upper rail 8 results in a rearward thrust being transmitted similarly through the belt-and-pulley connections to the other upper rail 9 to give it like movement simultaneously. The result is comparable to that obtained with the old system of gears and racks without the objectionable lost-motion and consequent lag in the movement of one slide relative to the other. The operation with this cable equalizer is also smoother and quieter. Since there is no perceptible lag in the movement of the rail 9 with respect to the rail 8, there is no tendency for the seat slides to bind, and hence it is noticeably easier to adjust the seat in either direction.

The same smooth and easy operation is obtainable with the crisscross arrangement $x$, $y$ of the cable shown at 43′ in Fig. 4. In that figure all parts corresponding to those appearing in Figs. 1 to 3 have been given prime numbers, thus the pulleys 33′ and 35′ correspond to the pulleys 33 and 35 in Fig. 2, the pulleys 40′ and 42′ correspond to the pulleys 40 and 42 in Fig. 2, the upper pulleys 39 and 41 of Fig. 2 being eliminated with this crisscross arrangement of the cable. The operation with this arrangement of the cable is obviously substantially the same as with the other arrangement above described. Still another crisscross arrangement of the cable working like the arrangement of Fig. 4 is possible in which upper pulleys 39 and 41 are used. In that arrangement everything is like that shown in Fig. 4 except that flight $x$ is extended straight across from pulley 42′ 90° around left upper pulley 39 and forward diagonally to the pulley 33; the other flight $y$ being extended from pulley 40′ straight across to the right upper pulley 41 and diagonally forward to the pulley 35.

While I have shown the, at present, preferred arrangement with the pulleys of the belt-and-pulley system of connections mounted on the upper movable rails and the cable connected to the fixed lower rails, this arrangement may be reversed, mounting the pulleys on the fixed lower rails and attaching the cable to the movable upper rails, obtaining the same operation and the same advantages so far as smooth, easy operation, and so forth, are concerned. On the other hand, the higher elevation of the pulleys and cable obtained with the arrangement disclosed has advantages from the standpoint of greater clearance, such as avoiding rubbing of cable or pulleys on the floor or on adjacent parts under the seat.

It is believed the foregoing description conveys a good understanding of the objects and advantages of my invention. The appended claims have been drawn to cover all legitimate modifications and adaptations.

I claim:

1. In a vehicle seat slide construction, the combination of a pair of laterally spaced substantially horizontal seat slide structures each comprising a fixed bottom rail member on which is supported a relatively movable upper rail member adapted to support an end portion of an elongated vehicle seat, pulleys rotatably mounted on said upper rail members in longitudinally spaced relation, a single continuous equalizing belt element extending around the system of pulleys, and means for attaching the belt element to each of the bottom rail members at a point intermediate said pulleys, whereby movement of either upper rail member results in a corresponding movement of the other upper rail member simultaneously.

2. In a vehicle seat slide construction, the combination of a pair of laterally spaced substantially horizontal seat slide structures each comprising a fixed bottom rail member on which is supported a relatively movable upper rail member adapted to support an end portion of an elongated vehicle seat, pulleys rotatably mounted on said upper rail members in longitudinally spaced relation, a single continuous equalizing belt element which extends lengthwise of the upper rail members and around said pulleys and in crisscross relation from the forward pulleys on one of the upper rail members to the opposed rearward pulleys on the other upper rail member, and means for attaching the belt element to each of the lower rail members at a point intermediate the forward and rearward pulleys, whereby movement of either upper rail member results in a corresponding movement of the other upper rail member simultaneously.

3. In a vehicle seat slide construction, the combination of a pair of laterally spaced substantially horizontal seat slide structures each comprising a fixed bottom rail member on which is supported a relatively movable upper rail member adapted to support an end portion of an elongated vehicle seat, pulleys rotatably mounted on said upper rail members in longitudinally spaced relation, a single continuous equalizing belt element having two substantially parallel flights extended around pulleys on one end portion of the upper rail members, the belt element having loop portions formed by extensions of said flights extending toward the other end portions of said upper rail members and passed around pulleys on said end portions, and means for attaching one side of each of said loop portions to the bottom rail members at a point intermediate the pulley locations, whereby movement of either upper rail member results in a corresponding movement of the other upper rail member simultaneously.

4. In a vehicle seat slide construction, the combination of a pair of laterally spaced substantially horizontal seat slide structures each comprising a fixed lower rail member on which is supported a relatively movable upper rail member adapted to support an end portion of an elongated vehicle seat, pulleys rotatably mounted on one pair of like rail members in longitudinally spaced relation, a single continuous equalizing belt element which extends lengthwise of the last named rail members and around said pulleys and in crisscross relation from the forward pulleys on one of the last named rail members to the opposed rearward pulleys on the other rail member, and means for attaching the belt element to each of the other pair of like rail members, each connection being at a point intermediate the forward and rearward pulleys, whereby movement of either upper rail member results in a corresponding movement of the other upper rail member simultaneously.

5. A seat slide construction as set forth in claim 4 including means for taking up slack in the belt element and maintaining the same under a predetermined tension.

6. A seat slide construction as set forth in claim 4, including spring means for taking up slack in the belt element and maintaining the same under a predetermined tension, said spring means comprising a coiled tension spring stretched between and connected to the opposed end portions of the belt element.

7. A seat slide construction as set forth in claim 1, including means for taking up slack in the belt element and maintaining the same under a predetermined tension.

8. A seat slide construction as set forth in claim 2, including means for taking up slack in the belt element and maintaining the same under a predetermined tension.

9. A seat slide construction as set forth in claim 3, including means for taking up slack in the belt element and maintaining the same under a predetermined tension.

10. A vehicle seat comprising a seat element having a substantially horizontal bottom portion, a pair of laterally spaced substantially horizontal seat slide structures for supporting said bottom portion in a predetermined elevated relation to a vehicle floor, said seat slide structures each comprising a fixed bottom rail member on which is supported a relatively movable upper rail member carrying the bottom portion of the seat, and an equalizer for said seat housed substantially between said bottom portion of the seat element and said upper rail members and comprising cable guide members on each upper rail member in longitudinally spaced relation and continuous flexible cable means fixedly connected to the bottom rail members intermediate said cable guide members and extending around the cable guide members on the upper rail members to be in shifting engagement with the upper rail members through said cable guide members to maintain said upper rail members in a fixed fore and aft relationship to one another in all positions of adjustment of the upper rail members relative to the bottom rail members.

11. A vehicle seat comprising a seat element having a substantially horizontal bottom portion, a pair of laterally spaced substantially horizontal seat slide structures for supporting said bottom portion in a predetermined elevated relation to a vehicle floor, said seat slide structures each comprising a fixed bottom rail member on which is supported a relatively movable upper rail member carrying the bottom portion of the seat, and an equalizer for said seat housed substantially between said bottom portion of the seat element and said upper rail members and comprising cable guide members on each upper rail member in longitudinally spaced relation and continuous flexible cable means fixedly connected to the bottom rail members intermediate said cable guide members and extending around the cable guide members on the upper rail members to be in shifting engagement with the upper rail members through said cable guide members to maintain said upper rail members in a fixed fore and aft relationship to one another in all positions of adjustment of the upper rail members relative to the bottom rail members, and means for taking up slack in the flexible cable means and maintaining the same under a predetermined tension.

12. A vehicle seat comprising a seat element having a substantially horizontal bottom portion, a pair of laterally spaced substantially horizontal seat slide structures for supporting said bottom portion in a predetermined elevated relation to a vehicle floor, said seat slide structures each comprising a fixed bottom rail member on which is supported a relatively movable upper rail member carrying the bottom portion of the seat, and an equalizer for said seat housed substantially between said bottom portion of the seat element and said upper rail members and comprising cable guide members on each upper rail member in longitudinally spaced relation and continuous flexible cable means fixedly connected to the bottom rail members intermediate said cable guide members and extending around the cable guide members on the upper rail members to be in shifting engagement with the upper rail members through said cable guide members to maintain said upper rail members in a fixed fore and aft relationship to one another in all positions of adjustment of the upper rail members relative to the bottom rail members, and spring means for taking up slack in the flexible cable means and maintaining the same under a predetermined tension, said spring means comprising a coiled tension spring interposed intermediate the ends of said cable means in stretched condition.

13. In an adjustable support for vehicle seats, a seat slide construction comprising a pair of laterally spaced fixed substantially horizontal parallel bottom rail members, an upper rail member mounted on each of said bottom rail members for longitudinal adjustment relative thereto, said upper rails being substantially coextensive with the bottom rails and forming the end supports for an elongated vehicle seat, pulleys rotatably mounted on said upper rail members adjacent the ends thereof, a single continuous equalizing belt extending around the system of pulleys on said upper rail members, and means attaching one flight of the belt element fixedly to each of said bottom rail members at a point substantially midway between the ends thereof, whereby movement of either upper rail member in either direction effects a corresponding movement of the other upper rail member simultaneously in the same direction.

14. In an adjustable support for vehicle seats, a seat slide construction comprising a pair of laterally spaced fixed substantially horizontal parallel bottom rail members, an upper rail member mounted on each of said bottom rail members for longitudinal adjustment relative thereto, said upper rails being substantially coextensive with the bottom rails and forming the end supports for an elongated vehicle seat, pulleys rotatably mounted on said upper rail members adjacent the ends thereof, a single continuous equalizing belt extending around the system of pulleys on said upper rail members, means attaching one flight of the belt element fixedly to each of said bottom rail members at a point substantially midway between the ends thereof, whereby movement of either upper rail member in either direction effects a corresponding movement of the other upper rail member simultaneously in the same direction, and means for taking up slack in said belt element and maintaining the same under tension.

15. In an adjustable self-equalizing support for vehicle seats, a seat slide construction comprising a pair of laterally spaced fixed substantially horizontal parallel bottom rail members, a pair of upper rail members one mounted on each of said bottom rail members for longitudinal adjustment relative thereto, said upper rail members being substantially coextensive with the bottom rail members and forming end supports for an elongated vehicle seat, pulleys rotatably mounted on one pair of like rail members adjacent each end thereof, a single continuous equalizing belt extending around the system of pulleys mounted on the last named rail members and means attaching one flight of the belt element fixedly to each of the other pair of rail members substantially midway between the ends thereof, whereby movement of either upper rail member in either direction effects a corresponding movement of the other upper rail member simultaneously in the same direction.

WALTER R. LUSTIG.

REFERENCES CITED

The following references are of record in the file of this patent:

UNITED STATES PATENTS

| Number | Name | Date |
|---|---|---|
| 251,483 | Stiles | Dec. 27, 1881 |
| 865,114 | Mapes | Sept. 3, 1907 |
| 905,137 | Benjamin | Dec. 1, 1908 |
| 1,510,969 | Watrous | Oct. 7, 1924 |
| 1,934,893 | Thomas | Nov. 14, 1933 |
| 2,009,024 | Salmons | July 23, 1935 |
| 2,335,254 | Atwood et al. | Nov. 30, 1943 |
| 2,360,805 | Thoma | Oct. 17, 1944 |